United States Patent Office 3,518,348
Patented June 30, 1970

3,518,348
HALOGENATED PHENOL-BORATE FUNGICIDE COMPOSITIONS
Joseph Dulat, Surbiton, England, assignor to United States Borax & Chemical Corporation, Los Angeles, Calif.
No Drawing. Filed Feb. 1, 1966, Ser. No. 523,940
Claims priority, application Great Britain, Feb. 11, 1965, 6,000/65
Int. Cl. A01n 13/00
U.S. Cl. 424—148　　　　9 Claims

ABSTRACT OF THE DISCLOSURE

Dustless, granular, non-segregating fungicide compositions comprising a hydrated alkali metal borate and alkali metal salt of a halogenated phenol are provided. The granular compositions can be prepared by forming an admixture of a halogenated phenol or its salts and an alkali metal borate and adding water thereto.

This invention relates to novel granular alkali metal borate compositions, to processes for their production and to their use as fungicides.

It has been known for many years that mixtures containing alkali metal borates and alkali metal salts of halogenated phenols have effective fungicidal properties. One of the largest commercial users for such mixtures is in the prevention of fungal and mold staining of timber, and a considerable proportion of sawn timber is treated, usually by dipping in an aqueous solution, with a fungicidal mixture of the type mentioned above. However, the alkali metal salts of the halogenated phenols which are used in such fungicidal compositions are at present available only in the form of very finely-divided powders which are subject to accidental dispersion in the atmosphere as a dust. Since these halogen compounds have a serious irritant effect upon the skin and are dangerous to the eyes, special precautions have to be taken when handling them. Moreover, because of their small particle size they tend to segregate from the borate, and by the time the fungicidal mixture comes to be used, it is often no longer homogeneous and solutions prepared from it are not necessarily of the required concentration in respect of all the components. In this way the fungicidal effectiveness of the solutions is liable to be reduced.

According to the present invention, there is provided a method by which can be obtained an essentially granular, dust-free, non-segregating mixture comprising an alkali metal salt of a halogenated phenol and an alkali metal borate.

The process of the invention comprises forming an intimate mixture comprising an alkali metal salt of a halogenated phenol, a water-deficient alkali metal borate and water, if necessary removing from the mixture water in excess of that necessary to fully hydrate the said borate, and granulating the product thus obtained.

The term "water-deficient alkali metal borate" as used in this specification means an alkali metal borate which is anhydrous or has less than the theoretical maximum amount of water of hydration. Sodium tetraborate pentahydrate is presently preferred.

The said mixture formed in the process can be obtained in a variety of ways. For example, starting with the alkali metal salt of the halogenated phenol and the alkali metal borate (referred to hereinafter respectively as "phenate" and "borate") in the form of powders, they can be intimately mixed together and the resulting mixture mixed with the water. Alternatively, the phenate can be used in the form of an aqueous solution in the water and the solution mixed with the powdered borate. Where the phenate is used in the dry state, it is desirable to perform the mixing in closed equipment in order that the phenate is not dispersed as a dust in the atmosphere thereby creating a hazard to health.

Since the corresponding free halogenated phenols are in general, cheaper than the phenates, they provide an attractive starting material for producing the phenate in situ by reaction, for instance, with the appropriate alkali metal hydroxide.

Thus the phenol and borate are, for example, mixed in the dry state and the mixture then mixed with an aqueous solution of alkali metal hydroxide. Alternatively, the alkali metal hydroxide can be used in the dry state in forming the alkali metal salt. In this procedure, the phenol, borate and alkali metal hydroxide are conveniently mixed together in the dry state and then the mixture is mixed with water. The amount of alkali metal hydroxide is preferably sufficient to convert all of phenol to the corresponding phenate under the conditions of the reaction.

The amount of water introduced into the mixture is preferably limited so that the total amount of water present does not exceed that required to fully hydrate the water-deficient borate. In determining the total amount of water present, regard has to be held to the water introduced into the mixture (whether as such or as solvent, for instance, for alkali metal hydroxide), any water of hydration present in the starting materials and any water of reaction.

The alkali metal of the phenates and borates used as starting materials are preferably the sodium or potassium salts because of their cheapness and ready availability. For convenience, both phenate and borate are sodium salts. The halogenated phenol, whether used as such or as an alkali metal salt thereof, can be, for example, a tetrahalo- or a pentahalo-compound, for example tetrachlorophenol or pentachlorophenol. The borate can be, for instance a salt of any suitable acid of boron, but is especially a salt of tetraboric acid, such as sodium tetraborate and potassium tetraborate.

Preferred combinations of phenates and borates are the sodium salt of a halogenated phenol and a hydrated sodium tetraborate ($Na_2B_4O_7 \cdot xH_2O$) where $x$ is preferably less than or equal to 10.

Examples of such mixtures are:

sodium pentachlorophenate and borax
sodium tetrachlorophenate and borax
sodium penta- and tetrachlorophenates and borax
sodium 2-chloro-ortho-phenylphenate and borax
sodium 2-chloro-ortho-phenylphenate, sodium tetrachlorophenate and borax.

The compositions obtained as products of the process of the invention are useful water-soluble fungicides and are particularly valuable for the treatment of timber to control sap stain. The invention accordingly includes the fungicidal compositions and timber that has been treated with them.

The preferred proportion of phenolic constituent that is halogenated phenol or corresponding phenate, is in the range of from about 10 to about 75% by weight of the total weight of phenolic constituent and borate. Proportions of phenolic constituents in the upper part of said range are preferred where the compositions are to be used in tropical climates.

Other ingredients can be included in the mixture so as to form an intimate part of the granules. For example, if it is desired to include an additional insecticide, a material such as hexachlorobenzene or DDT can be added. Said other ingredients are conveniently incorporated in the dry state before the addition of water.

The invention is illustrated by the following examples but is not to be considered limited to the specific examples given.

EXAMPLE 1

Sodium pentachlorophenate (2500 grams) and sodium tetraborate pentahydrate (5000 grams) were intimately mixed in a drum mixer. Water (1000 grams) was sprayed onto this mixture over a period of half an hour while mixing was continued. When the addition of water was complete the product thus obtained was a granular dust-free material.

EXAMPLE 2

Pentachlorophenol (2600 grams) and sodium tetraborate pentahydrate (4500 grams) were mixed in a rotating drum mixer and a solution of sodium hydroxide (400 grams in water 1200 grams) was sprayed onto the agitated mixture. A granular dust-free product was obtained.

EXAMPLE 3

Dry, solid sodium hydroxide (400 grams) and pentachlorophenol (2600 grams) were ground together in a ball mill. The resultant powdered mixture was transferred to a drum mixer and mixed with sodium tetraborate pentahydrate (4620 grams). During the mixing, water (1400 grams; 2 moles per mole of borate) was sprayed onto the mixture. A granular dust-free product was obtained.

Thus, what has been provided is a superior granular fungicidal composition comprising hydrated alkali metal borate and alkali metal salt of halogenated phenol in which the phenol is intimately incorporated in the granule.

Various changes and modifications of the invention can be made and, to the extent that such variations incorporate the spirit of this invention, they are intended to be included within the scope of the appended claims.

What is claimed is:

1. The process for producing a dustless, granular, fungicidal composition which comprises forming an intimate admixture consisting essentially of a halogenated phenol selected from the group consisting of the chlorinated phenols, chlorinated phenylphenols, mixtures thereof, and the potassium and sodium salts thereof, and a sodium or potassium borate having not more than 10 moles of water of hydration, and, while mixing, adding water to said intimate admixture in an amount not exceeding that required to fully hydrate the sodium or potassium borate to form a nonsegregating granular composition, said halogenated phenol representing about 10 to about 75%, by weight, of said granular composition and said potassium and sodium salts of the phenols being formed in situ by addition of sodium or potassium hydroxide in solution with said water when the free halogenated phenol is employed.

2. The process according to claim 1 in which the borate is sodium tetraborate pentahydrate.

3. The process according to claim 1 in which said halogenated phenol is sodium pentachlorophenate.

4. The process according to claim 1 in which the borate and the halogenated phenol in the form of its sodium or potassium salt are intimately mixed and said water is sprayed upon the mixture to form a granular product.

5. The process according to claim 1 in which the chlorinated phenol or chlorinated phenylphenol and the borate are intimately mixed and an aqueous solution of sodium or potassium hydroxide is sprayed upon the mixture to form a granular product.

6. The process according to claim 1 in which the chlorinated phenol or chlorinated phenylphenol, the borate, and sodium or potassium hydroxide are intimately mixed and water is sprayed upon the mixture to form a granular product.

7. The process according to claim 4 in which sodium tetraborate pentahydrate and sodium pentachlorophenate are intimately mixed.

8. The process according to claim 5 in which pentachlorophenol and sodium tetraborate pentahydrate are intimately mixed.

9. The process according to claim 6 in which pentachlorophenol, sodium tetraborate pentahydrate and sodium hydroxide are intimately mixed.

References Cited

UNITED STATES PATENTS

| 2,392,987 | 1/1946 | Hill | 167—38.7 |
| 2,925,361 | 2/1960 | Bollenback | 167—31 |
| 1,965,508 | 7/1934 | Olsson. | |

FOREIGN PATENTS

| 1,324,215 | 3/1963 | France. |

OTHER REFERENCES

Chemical Abstracts, vol. 59, 1963, p. 8071(b).
Pharmaceutical Dispensing, Husa, 1947, pp. 91–95.
Condensed Chemical Dictionary, 1963, p. 164.

ALBERT T. MEYERS, Primary Examiner

D. J. FUNDERBURK, Assistant Examiner

U.S. Cl. X.R.

424—347